B. R. BENJAMIN.
HARVESTER.
APPLICATION FILED JUNE 12, 1915.
1,247,070.
Patented Nov. 20, 1917.
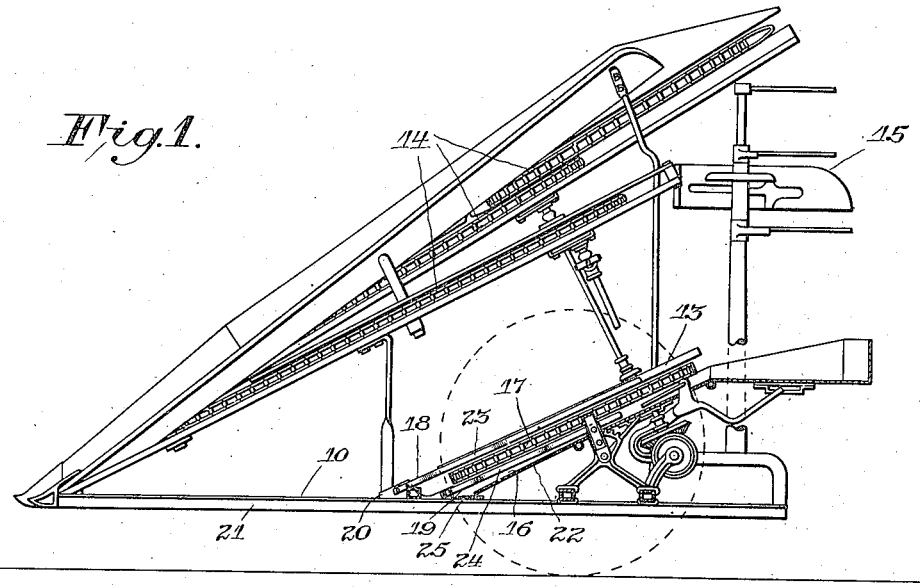
Fig.1.
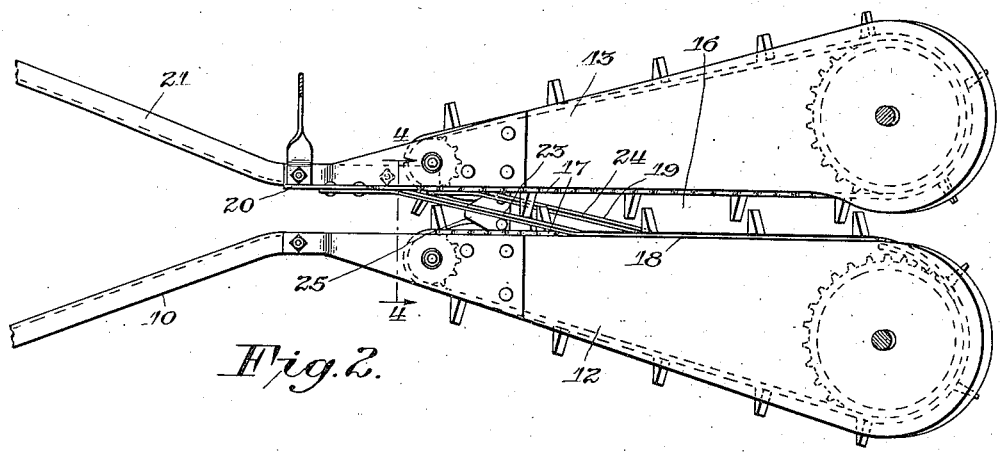
Fig.2.
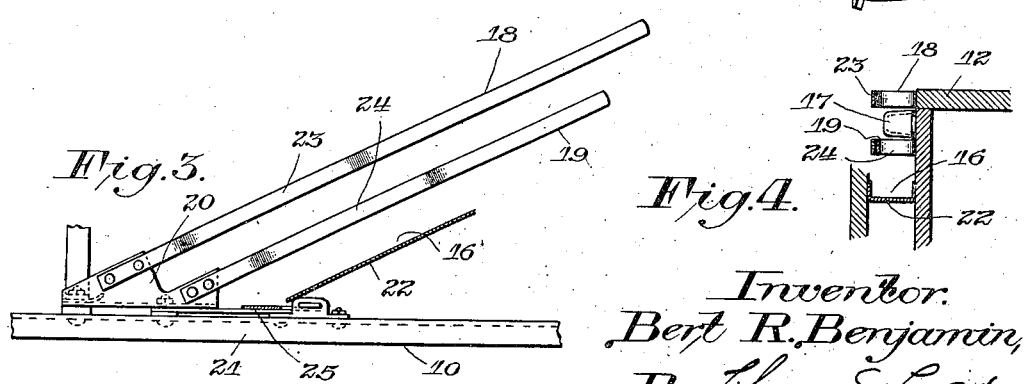
Fig.3.
Fig.4.
Inventor:
Bert R. Benjamin,
By Chas. E. Lord
Atty.

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

HARVESTER.

1,247,070.  Specification of Letters Patent.  Patented Nov. 20, 1917.

Application filed June 12, 1915. Serial No. 33,712.

*To all whom it may concern:*

Be it known that I, BERT R. BENJAMIN, a citizen of the United States, residing at Oak Park, in the county of Cook and State of Illinois, have invented certain new and useful Improvements in Harvesters, of which the following is a full, clear, and exact specification.

This invention relates to harvesters, and more particularly to means for insuring a positive feed of stalks from the cutting mechanism to the binding mechanism of a corn harvester.

It is old to provide a spring rod in the throat of a corn harvester for pressing the stalks against the butts forwarding chain. Thus far but a single spring rod has been placed either above or below the forwarding chain. The main disadvantage with such an arrangement is that short corn, especially if weedy conditions prevail, falls over to one side or the other and causes a general clogged condition in the throat of the machine intermediate the cutting and binding mechanisms. This, of course, is undesirable.

Therefore, the main object of my invention is to overcome the above mentioned objectionable features.

Another object is to insure the proper feeding of stalks from the cutting to the binding mechanism of a harvester.

A further object is to provide an arrangement adapted to meet all of the requirements for successful commercial operation.

These and other objects are accomplished by providing, in a harvester, the combination of cutting and binding mechanisms, forwarding means operating therebetween, and coöperating resilient members associated therewith to insure a proper feeding of stalks or the like from the cutting to the binding mechanism.

The invention is illustrated on the accompanying sheet of drawings, in which—

Figure 1 is a fragmentary side elevation of a corn harvester embodying my invention;

Fig. 2 is a fragmentary plan view of the same harvester;

Fig. 3 is a detached enlarged side elevation of the springs or resilient members associated with the butts forwarding chain intermediate the cutting and binding mechanisms; and Fig. 4 is a fragmentary sectional view taken in the plane of line 4—4 of Fig. 2, showing the throat of the harvester with the spring members on either side of the butts forwarding chain.

The various novel features of my invention will be apparent from the following description and drawings, and will be particularly set forth in the appended claims.

My invention is here disclosed in connection with a corn harvester having the usual properly supported main frame 10. Supported by the frame 10 are the gathering boards 12 and 13, associated with which are the usual chains 14 for gathering the stalks and forwarding the upper parts thereof to the usual binding mechanism 15.

No particular difficulty is encountered in forwarding stalks of corn from the cutting mechanism to the binding mechanism when the stalks are long. However, peculiar problems are encountered when the stalks are short, and especially so when weedy conditions prevail. It has been found that there is a great tendency to and that short stalks do fall over and become clogged in the throat 16 of the machine even where a single spring is used either above or below the butts forwarding chains 17. To overcome this I have provided in the throat 16 of the machine two resilient members, or springs, 18 and 19, respectively, above and below one of the conveyer members 17, both of which are secured to an integral bracket 20 fastened to the lower member 21 of the frame on the grainward side of the throat in advance of the cutting mechanism 25. These springs, or pressure members, are arranged in parallel relation with respect to each other and extend toward the rear of the machine at an inclination to the surface of the ground and parallel with the bottom of the channel member 22 forming the throat 16 of the machine.

It will be noted that the upper spring 18 is located in advance of the lower flat spring 19 and has a bent portion 23 extending laterally and stubblewardly, which also is in advance of a similar bent portion 24 of flat spring 19, which bent portion also extends laterally and stubblewardly. The bent portion 23 of spring 18 is in advance of the bent portion 24 of spring 19 to permit the bent portion 23 of the upper spring 18 to engage the stalks first to straighten the same if they are presented to the harvester in a leaning position. It is necessary that the upper spring engage the leaning stalks first to accomplish this result. The rear end portions of the spring members 18 and 19 are substantially in the same vertical plane as viewed in Fig. 2, and terminate adjacent the binding mechanism 15, as seen in Fig. 1, the upper spring 18 extending farther to the rear of the machine than the lower spring 19.

By means of this spring arrangement, it is apparent that as the harvester is advancing, stalks of corn are first engaged by the bent portion 23 of the upper spring 18, and if the stalks are leaning, they are forced into an upright position. The stalks, aided by the action of the chains 17, then are passed into engagement with, and cut by, the cutting mechanism 25 and are fed rearwardly of the machine by said butts forwarding chains 17, which may be driven in any suitable manner. The springs 18 and 19 being located above and below, respectively, of the butts forwarding chains 17, balance the stalks whether or not the latter are short and whether or not weedy conditions prevail, thereby preventing any clogging in the throat of the machine. As the stalks continue to pass rearwardly of the machine, it will be noted that they pass out of engagement with the lower spring 19 before they pass out of engagement with the upper spring 18. This is for the purpose of preventing any clogging of the throat which otherwise might occur. The ends of the springs 18 and 19 being adjacent the binding mechanism, it is seen that a positive feeding of the stalks from the cutting mechanism to the binding mechanism is insured.

It is evident that there may be various modifications in the precise arrangement herein shown and described, and it is my intention to cover all such modifications which do not involve a departure from the spirit and scope of my invention.

What I claim as new is:

1. In a harvester, the combination of a conveyer, and a plurality of resilient members supported to one side of the conveyer and respectively extending laterally over and under said conveyer to hold stalks in an upright position as they are conveyed.

2. In a harvester, the combination of a conveyer, and a plurality of resilient members supported to one side of the conveyer and respectively extending laterally over and under said conveyer to hold stalks in an upright position as they are conveyed, one of said members being in advance of the other to give the stalk an upright position if it is otherwise disposed.

3. In a harvester, the combination of a conveyer member, and parallel arranged resilient members above and below said conveyer member, said resilient members having oblique parallel laterally extending portions, the laterally extending portion of one being in advance of that of the other.

4. In a harvester, the combination of frame members forming a stalk passageway, a conveyer member, and resilient members associated therewith, said resilient members being secured to one of said frame members on one side of said passageway, having portions extending across said passageway, and having other portions extending along the other side of said passageway directly above and below said conveyer member.

5. In a harvester, the combination of a conveyer member, and pressure members above and below and adjacent said conveyer member for forcing stalks into engagement with said conveyer member, one of said pressure members being located in advance of the other for engaging a stalk before the second pressure member to give the stalk an upright position if it is otherwise disposed.

6. In a harvester, the combination of a conveyer member, and pressure members above and below said conveyer member for forcing stalks into engagement with said conveyer member, one of said pressure members being located in advance of the other for engaging a stalk before the second pressure member to give the stalk an upright position, said first mentioned pressure member also maintaining engagement with the stalk after the stalk has passed out of engagement with the other pressure member to prevent a clogged condition.

In testimony whereof I affix my signature.

BERT R. BENJAMIN.